United States Patent
Kunii

(10) Patent No.: US 8,064,902 B2
(45) Date of Patent: Nov. 22, 2011

(54) COMMUNICATION APPARATUS AND COMMUNICATION SYSTEM

(75) Inventor: Tadahiro Kunii, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 927 days.

(21) Appl. No.: 12/037,473

(22) Filed: Feb. 26, 2008

(65) Prior Publication Data

US 2008/0204801 A1 Aug. 28, 2008

(30) Foreign Application Priority Data

Feb. 28, 2007 (JP) ................................. 2007-050741

(51) Int. Cl.
    *H04W 24/00* (2009.01)
(52) U.S. Cl. .................... 455/426.1; 455/41.2; 455/450; 455/418; 455/556.1; 455/574; 455/458; 358/1.15
(58) Field of Classification Search .............. 455/426.1, 455/556.1, 450–452.2, 41.2; 358/1.15
    See application file for complete search history.

(56) References Cited

U.S. PATENT DOCUMENTS

| | | | | |
|---|---|---|---|---|
| 5,347,524 A * | 9/1994 | I'Anson et al. | ................. | 714/39 |
| 5,446,553 A * | 8/1995 | Grube | ........................... | 358/402 |
| 5,826,172 A | 10/1998 | Ito et al. | | |
| 6,275,696 B1 * | 8/2001 | Paik | ............................ | 455/426.1 |
| 6,493,104 B1 * | 12/2002 | Cromer et al. | ............... | 358/1.15 |
| 6,744,528 B2 * | 6/2004 | Picoult et al. | ................ | 358/1.15 |
| 7,107,058 B2 * | 9/2006 | Inoguchi et al. | .............. | 455/450 |
| 7,385,721 B2 * | 6/2008 | Shahindoust | ................ | 358/1.15 |
| 7,450,946 B2 * | 11/2008 | Wilson et al. | ................ | 455/445 |
| 7,583,958 B2 * | 9/2009 | Coskun et al. | ............. | 455/414.4 |
| 7,761,090 B2 * | 7/2010 | Silverbrook et al. | ......... | 455/418 |
| 7,860,047 B2 * | 12/2010 | Urushihara et al. | .......... | 370/328 |
| 2004/0160623 A1 * | 8/2004 | Strittmatter et al. | ......... | 358/1.15 |
| 2008/0247336 A1 | 10/2008 | Sugitani | | |
| 2011/0002009 A1 * | 1/2011 | Ohashi | ........................ | 358/1.15 |

FOREIGN PATENT DOCUMENTS

| | | |
|---|---|---|
| CN | 1123077 A | 5/1996 |
| JP | 6224837 A | 8/1994 |
| JP | 11341534 A | 12/1999 |
| JP | 2000-286991 A | 10/2000 |
| JP | 2001-028566 A | 1/2001 |
| JP | 2001-274742 A | 10/2001 |
| JP | 2004-363728 A | 12/2004 |
| JP | 2005-295368 A | 10/2005 |

OTHER PUBLICATIONS

The State Intellectual Property Office of the People's Republic of China; Notification of First Office Action in Chinese Patent Application No. 200810081382.X (counterpart to the above-captioned U.S. patent application) mailed Apr. 13, 2010.

(Continued)

*Primary Examiner* — Sharad Rampuria
(74) *Attorney, Agent, or Firm* — Baker Botts L.L.P.

(57) ABSTRACT

A communication apparatus includes: a first communication unit which wirelessly communicates with a first device using a channel in a frequency band; a determination unit which determines a number of times by which the first communication unit transmits data to the first device before transmitting the data; and a communication controller which controls the first communication unit to transmit the data to the first device by the number of times determined by the determination unit.

15 Claims, 12 Drawing Sheets

OTHER PUBLICATIONS

Japan Patent Office, Notification of Reason for Refusal for Japanese Patent Application No. 2007-050741 (counterpart to above-captioned patent application), dispatched May 10, 2011.

Japan Patent Office, Decision to Grant for Japanese Patent Application No. P2007-050741 (counterpart to above-captioned patent application), mailed Aug. 9, 2011.

* cited by examiner

COMMUNICATION APPARATUS AND COMMUNICATION SYSTEM

CROSS-REFERENCE TO RELATED APPLICATION

This application claims priority from Japanese Patent Application No. 2007-050741, filed on Feb. 28, 2007, the entire subject matter of which is incorporated herein by reference.

TECHNICAL FIELD

Aspects of the present invention relate to a communication apparatus and a communication system, more particularly, to a communication apparatus and a communication system which can maintain excellent communication quality by simple processing and realize power saving.

BACKGROUND

A communication apparatus wirelessly communicates with different devices using the same frequency band by a plurality of wireless communication methods. However, in this communication apparatus, the same frequency band is used by the respective wireless communication methods so that radio wave interference occurs and may harmfully influence the communication quality. JP-A-Hei. 6-224837 describes a wireless mobile phone device which receives a same signal about one data by a plurality of times at different times and maintains excellent communication quality by selecting a signal without errors among the received signals.

However, according to the wireless mobile phone device, the same signal about one data is received by a plurality of times at different times so that wasteful power would be consumed. JP-A-Hei. 11-341534 describes a radio calling receiver which realizes power saving by detecting errors in received information on a sub-frame basis and omitting the operation for receiving information on a sub-frame in which no error has detected, that is, which has been correctly received, from the next same sub-frame receiving.

However, according to the wireless calling receiver, it is required to execute determination processing to determine whether an error exists in each sub-frame, and therefore, the entire processing becomes complicated.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a communication apparatus and a communication system which can maintain excellent communication quality and realize power saving by simple processing.

According to an exemplary embodiment of the present invention, there is provided a communication apparatus comprising: a first communication unit which wirelessly communicates with a first device using a channel in a frequency band; a determination unit which determines a number of times by which the first communication unit transmits data to the first device before transmitting the data; and a communication controller which controls the first communication unit to transmit the data to the first device by the number of times determined by the determination unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Figure 1:
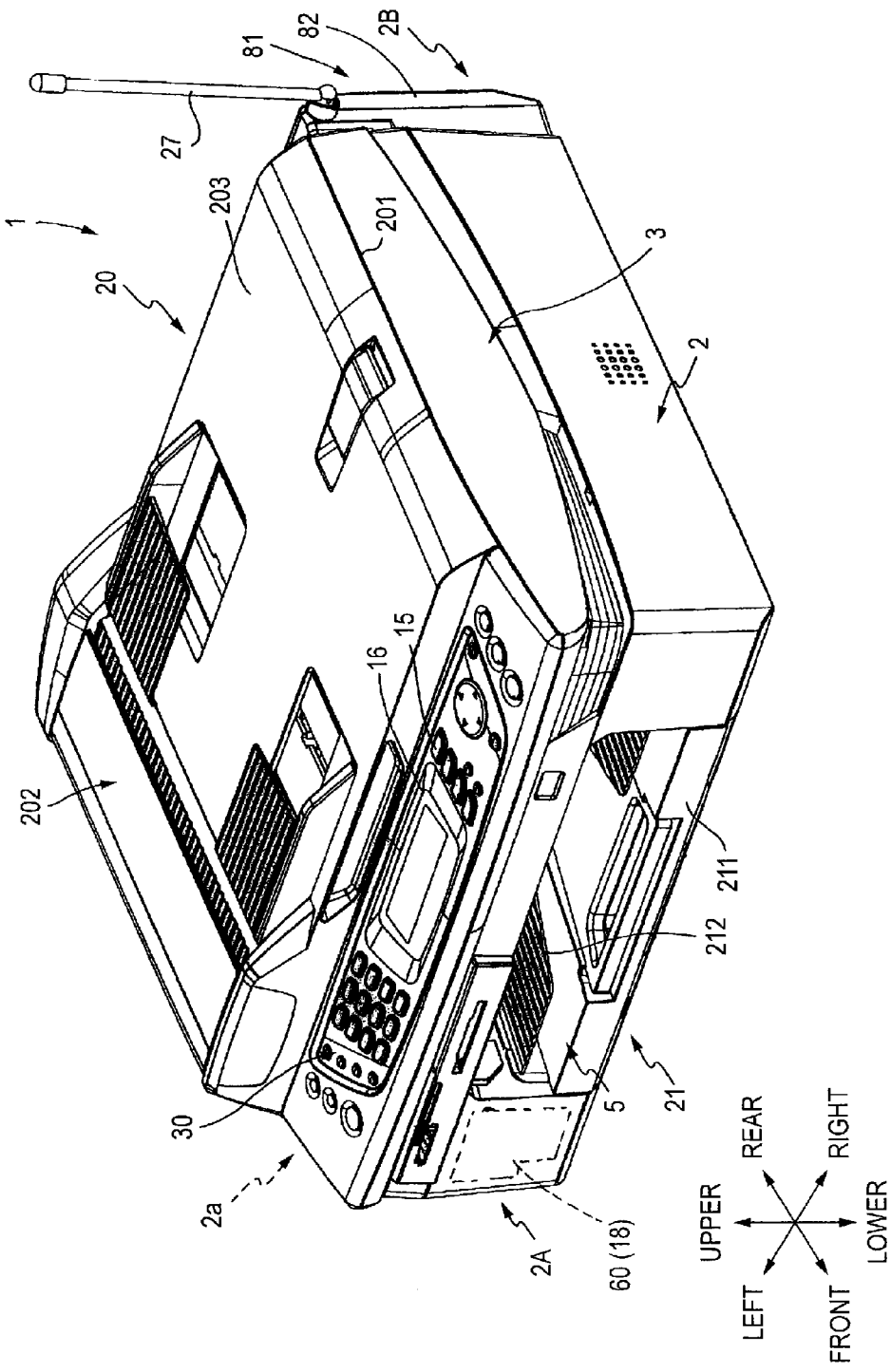
FIG. 1 is an external view of an Multi Function Peripheral (MFP) including a communication apparatus according to a first exemplary embodiment of the present invention.

Hereinafter, exemplary embodiments of the present invention will be described with reference to the accompanying drawings. First, with reference to FIG. 1 and FIG. 2, a multi function peripheral (hereinafter, referred to as MFP) including a communication apparatus according to a first exemplary embodiment of the present invention will be described. FIG. 1 is an external view of an MFP.

As shown in FIG. 1, a MFP 1 has various functions such as a calling function, a facsimile function, a printer function, a scanner function, a copying function, etc. In this exemplary embodiment, the MFP 1 serves as a main device of a digital cordless telephone which enables calling with a mobile device 31 (see FIG. 3) or an external device (not shown) via a telephone line network 100 (see FIG. 3). The MFP 1 also serves as a communication apparatus capable of communicating data with an access point 51 (see FIG. 3) by wireless communication based on the wireless LAN standards.

As shown in FIG. 1, the MFP 1 has a substantially box-shaped main body case 2 whose upper face is opened, and an upper case 3 which is pivotally attached to one side (left side in FIG. 1) of the main body case 2 via rotating pivot portions such as joints or hinges (not shown). The main body case 2 and the upper case 3 are injection-molded items made of a synthetic resin.

On the front side of the upper case 3 (the lower side in FIG. 1), an operation panel 30 is disposed. On the operation panel 30, an operating unit 15 including numeric buttons, a start button, and function operating buttons, etc., is provided. A user can operate this operating unit 15 to turn ON/OFF the power supply of the MFP 1, switch the functions, and instruct various operations.

On the operation panel 30, a display unit 16 such as a liquid crystal display (LCD) 16 is provided. This display unit 16 displays menus and operation statuses corresponding to the operation of the operating unit 15. By operating the operating unit 15, a user can make the display unit 16 display information in response to the operation and can confirm various information such as a communication status between the MFP 1 and the access point 51 (see FIG. 3) and a communication status between the MFP 1 and the mobile device 31 (see FIG. 3).

In the upper case 3, a scanner 20 is provided on the rear side (upper side in FIG. 1) of the operation panel 30. The scanner 20 includes a document cover 203 having an auto document feeder (ADF) 202 and being attached to a document reading table 201 serving as an flatbed Scanner (FBS) via hinges (not shown) on the back surface side so as to open and close. Although not shown, a platen glass is disposed on the upper surface of the document reading table 201 and an image reading unit is installed inside the document reading table 201.

On the other hand, in the main body case 2, a printer 21 is provided. The printer 21 is an ink-jet image recording device (ink-jet recorder) which records an image on a recording sheet by selectively ejecting ink drops based on image data read by the scanner 20 or image data inputted from the outside. The ink-jet method is an example of image recording methods of the printer 21, and various image recording devices such as electrophotographic or thermal transfer recording devices can also be employed.

On the front side of the MFP 1, that is, on the front side of the printer 21, an opening 5 is formed. Inside this opening 5, a sheet feeding cassette 211 in which a plurality of recording sheets are stacked on the bottom is disposed, and this feeding cassette 211 can be drawn from the opening 5 of the main body case 2. Above the sheet feeding cassette 211, a sheet discharging tray 212 onto which recording sheets having images recorded thereon are discharged is provided.

Inside the main body case 2 (inside the printer 21), a sheet conveyance path which extends upward from the inner side of the sheet feeding cassette 211 and then curves in a U shape toward the front side and is joined to the sheet discharging tray 212 is provided. Inside the main body case 2 (inside the printer 21), a sheet feed unit (not shown) which picks out one recording sheet from the inner side of the paper feeding cassette 211 and supplies it to the sheet conveyance path, and an ink-jet printer head (not shown) which is disposed within the sheet conveyance path and ejects ink drops on the surface of the recording sheet conveyed in the sheet conveyance path to record an image thereon, are provided.

Figure 3:
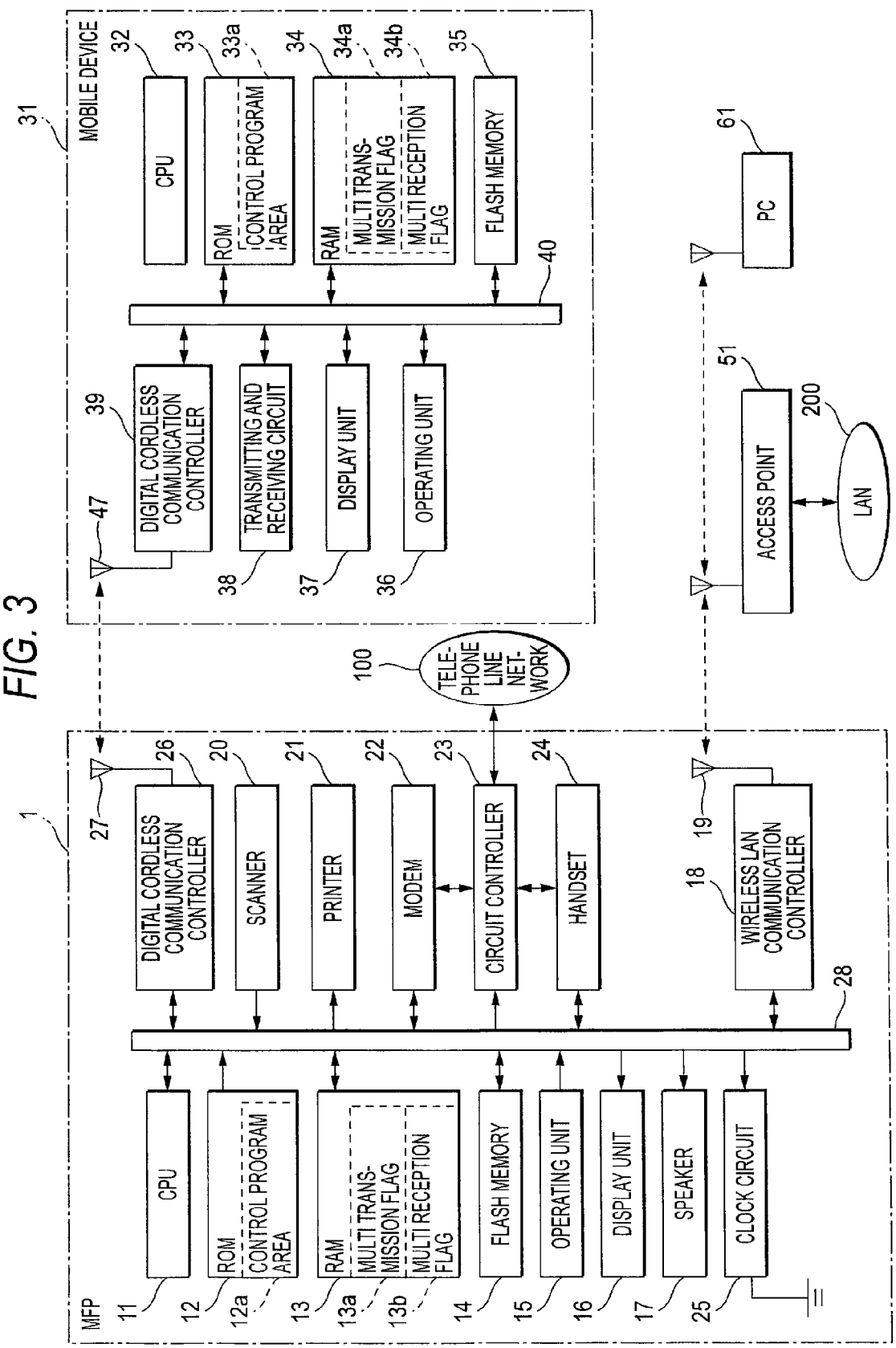
FIG. 3 is a block diagram showing electrical configuration of the MFP and a mobile device.

On the left side wall 2a of the main body case 2, a handset 24 (see FIG. 3) and a receiver (not shown) which receives the handset 24 in standby are disposed so as to enable calling with the mobile device 31 (see FIG. 3) or an external device (not shown) via a telephone line network 100 (see FIG. 3).

To the right edge of the rear side of the main body case 2, a wireless communication unit 81 is attached. This communication unit 81 includes a synthetic resin-made casing 82, and inside it, a communication board (not shown) including a digital cordless communication controller 26 (see FIG. 3) is housed. The digital cordless communication controller 26 wirelessly connects the handset 24 (see FIG. 3) of the MFP 1 as the main device and the mobile device 31 (see FIG. 3) as another handset disposed at a position remote from the MFP 1, and has a transmitting and receiving cordless antenna 27 projecting from the casing 82 although the details will be described later.

As described above, the MFP 1 of this exemplary embodiment is provided with the handset 24 (see FIG. 3) directly attached to the MFP 1 as a main device and the wireless communication unit 81 which is wirelessly connected to the digital mobile device 31 (see FIG. 3). According to usage, the handset 24 or the mobile device 31 can be selectively used, and further, it is also possible to call between the handset 24 and the mobile device 31.

Further, among the four corners of the main body case 2, at the corner 2B to which the wireless communication unit 81 housing the communication board including the digital cordless communication controller 26 is attached and at the corner 2A positioned diagonally opposite to the corner 2B, a wireless unit board (wireless LAN board) 60 including a wireless LAN communication controller 18 (see FIG. 3) and a main circuit board (not shown) for electrically controlling the driving of each device included in the MFP 1 are disposed.

In the MFP 1 of this exemplary embodiment, the main circuit board (not shown) and the wireless unit board 60 including the wireless LAN communication controller 18 (see FIG. 3), and the wireless communication unit 81 housing the communication board (not shown) including the digital cordless communication controller 26 (see FIG. 3) are disposed so as to be spaced from each other. Therefore, noise hardly occurs in the wireless unit board 60 including the wireless LAN communication controller 18 (see FIG. 3), the communication board (not shown) including the digital cordless communication controller 26 (see FIG. 3), and the main circuit board (not shown).

Figure 2:
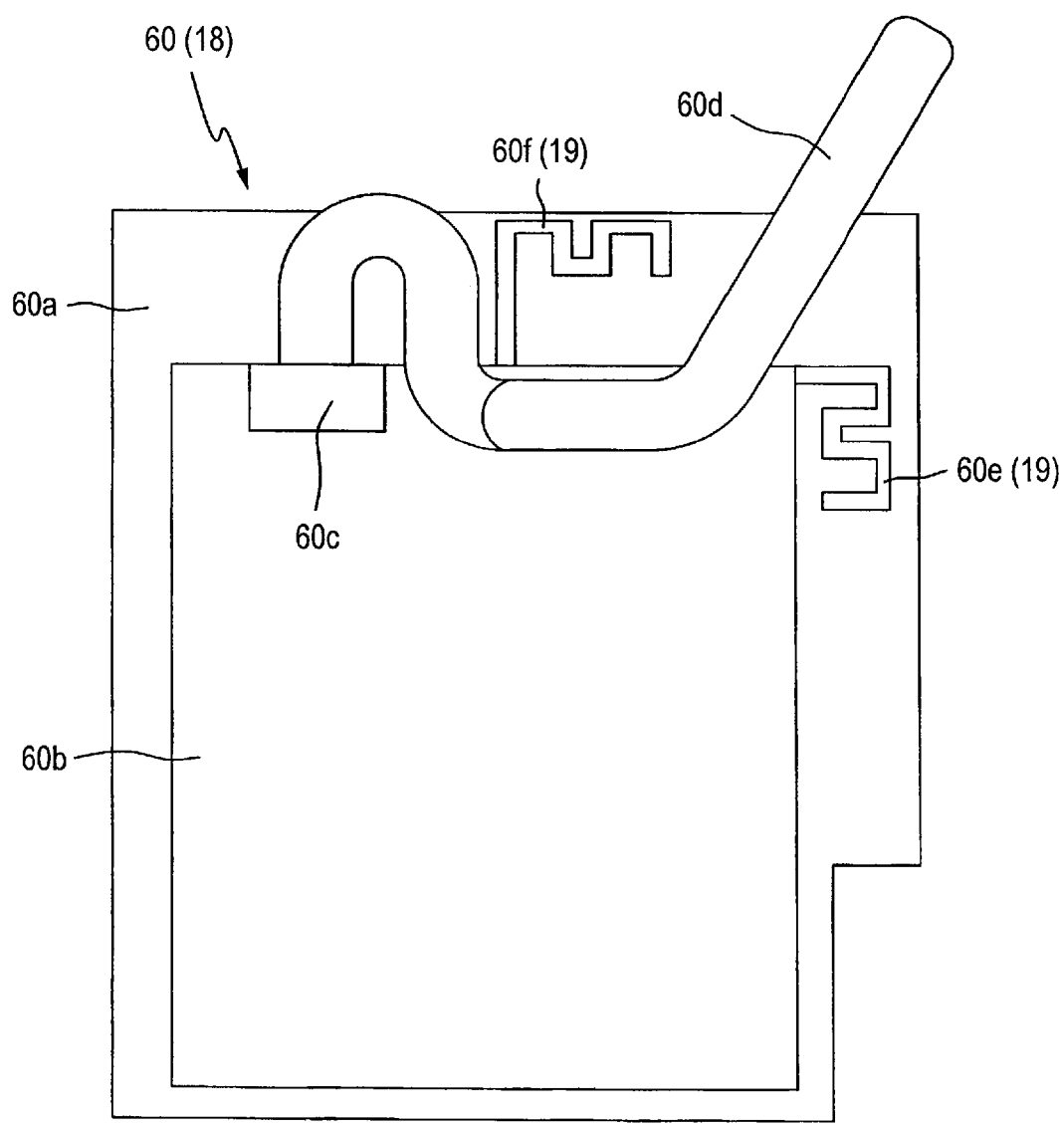
FIG. 2 is a front view of a wireless unit board (wireless LAN board)

Herein, FIG. 2 is a front view of the above-described wireless unit board (wireless LAN board) 60. As shown in FIG. 2, in the wireless unit board 60 including the wireless LAN communication controller 18 (see FIG. 3), a circuit module 60b is mounted on one surface (front surface) of a board 60a made of a glass-epoxy material, and to a connector 60c provided on a part of this circuit module 60b, a harness 60d for wiring is detachably connected.

As shown in FIG. 2, on the surface of the board 60a, a main antenna 60e and a sub antenna 60f are formed on a side and an upper side, respectively, of the circuit module 60b in proximity to the circuit module 60b. These main antenna 60e and the sub antenna 60f constitute a wireless LAN antenna 19 (see FIG. 3), and via this wireless LAN antenna 19 (that is, antennas 60e and 60f), the wireless LAN communication controller 18 (see FIG. 3) and the access point 51 (see FIG. 3) are wirelessly connected to each other.

Meanwhile, the communication board (not shown) including the digital cordless communication controller 26 (see FIG. 3) and a power supply board (not shown) may become a noise source. Between these, to the communication board including the digital cordless communication controller 26, a cordless antenna 27 is connected, and this cordless antenna 27 performs transmission and reception by using high-intensity radio waves, so that this may become an especially high noise source.

However, in the MFP 1 of this exemplary embodiment, the wireless unit board 60 is disposed at the front left corner 2A of the main body case 2, and on the other hand, the communication board including the digital cordless communication controller 26 is disposed at the position diagonally opposite to the corner 2A, that is, at the rear right corner 2B of the main body case 2. Thus, in the MFP 1 of this exemplary embodiment, inside the same casing (main body case 2), the wireless unit board 60 is spaced as far as possible from the communication board including the digital cordless communication controller 26, so that this wireless unit board 60 is hardly influenced by the communication board including the digital cordless communication controller 26, and this is effective as a measure against noise.

Next, the electrical configuration of the MFP 1 and the mobile device 31 will be described with reference to FIG. 3. FIG. 3 is a block diagram showing the electrical configuration of the MFP 1 and the mobile device 31. The mobile device 31 is also one example of the communication apparatus according to this exemplary embodiment of the present invention like the MFP 1. The MFP 1 and the mobile device 31 are included in a communication system according to an embodiment of the present invention.

As shown in FIG. 3, the MFP 1 mainly includes a CPU 11, a ROM 12, a RAM 13, a flash memory 14, the above-described operating unit 15, the above-described display unit 16, a speaker 17, the wireless LAN communication controller 18, the wireless LAN antenna 19, the scanner 20, the printer 21, a modem 22, a circuit controller 23, the handset 24, a clock circuit 25, and the digital cordless communication controller 26, and these are connected to each other via a bus line.

The CPU 11 is an operational unit which controls the respective units connected via a bus line 28 according to fixed values and programs stored in the ROM 12, the RAM 13, and the flash memory 14, or according to various signals transmitted and received via the wireless LAN communication controller 18, the circuit controller 23, and the digital cordless communication controller 26.

The ROM 12 is a non-rewritable memory provided with a control program area 12a as an area in which various control programs to be executed in this MFP 1 are stored. In the control program area 12a, for example, programs for executing processings shown in the flowcharts of FIG. 4 and FIG. 6 described later are stored.

The RAM 13 is a rewritable memory for temporarily storing various data. In this RAM 13, a multi transmission flag 13a and a multi reception flag 13b are provided.

The multi transmission flag 13a indicates whether the number of data transmissions to the mobile device 31 is set to 1 or 2, and when the number of data transmissions to the mobile device 31 is set to 1, the multi transmission flag is turned off, and when the number of data transmissions to the mobile device 31 is set to 2, the multi transmission flag is turned on.

The multi transmission flag 13a is initialized to be off according to turning-on of the power supply to the MFP 1, and is appropriately turned on and off according to the use status of the wireless LAN by number-of-communications setting processing (see FIG. 4) to be repeated at predetermined time intervals (for example, 10 sec).

The multi reception flag 13b indicates whether the number of data transmissions from the mobile device 31, that is, the number of data receptions from the mobile device 31 is set to 1 or 2, and when the number of receptions is set to 1, the multi reception flag is turned off, and when the number of receptions is set to 2, the multi reception flag is turned on.

The multi reception flag 13a is initialized to be off according to turning-on of the power supply to the MFP 1, and is appropriately turned on and off according to the use status of the wireless LAN by number-of-communications setting processing (see FIG. 4) to be repeated at predetermined time intervals (for example, 10 sec).

The flash memory 14 is a rewritable non-volatile memory, and data stored in this flash memory 14 is stored even after the power supply of the MFP 1 is turned off. The speaker 17 outputs various sounds corresponding to the statuses (for example, operation sounds of the operating unit 15, warning sounds when an error occurs, and ring tones, etc.), and notifies a user of the status by sounding such sounds.

The scanner 20 reads an image from a document set on the document reading table 201 based on a command from the CPU 11, and generates image data that can be displayed on the display unit 16 and printed by the printer 21. Image data read by this scanner 20 is stored in a predetermined storage area in the RAM 13 when the MFP 1 is set to a FAX mode, a scanner mode, or a copy mode. The printer 21 performs printing on a recording sheet inside the sheet feeding cassette 211 based on a command from the CPU 11.

The modem 22 modulates transmitting data stored in the RAM 13 into an image signal transmittable to the telephone line network 100 based on a command from the CPU 11, and transmits it via the line controller 23, or receives an image signal inputted via the line controller 23 from the telephone line network 100 and demodulates it into image data that can be displayed on the display unit 16 or can be printed by the printer 21. The line controller 23 is connected to the telephone line network 100, and sends out a dial signal to the telephone line network 100 and controls a response to a call signal from the telephone line network 100.

The handset 24 is a device for calling with the mobile device 31 or an external device (not shown) connected via the telephone line network 100, and includes a microphone (not shown) which converts voice into a voice signal and outputs it to the circuit controller 23 and a speaker (not shown) which converts a voice signal inputted from the circuit controller 23 into voice and outputs (sounds) it to the outside.

This handset 24 is electrically connected to the circuit controller 23 or the digital cordless communication controller 36 when an operation of taking this handset off the MFP 1 (off-hook operation) is performed. When an operation of returning the handset 24 onto the main body of the MFP 1 (on-hook operation) is performed, the handset 24 is disconnected from the circuit controller 23 or the digital cordless communication controller 36. The clock circuit 25 is a known circuit which includes an internal clock which clocks a present date and time, and calculates a time required by comparing a date and time of clocking start and the present date and time.

The digital cordless communication controller 26 is a part of the above-described communication board (not shown), and a cordless antenna 27 is connected thereto. As a result of connection between the handset 24 and the digital cordless communication controller 26 by an off-hook operation or the like of the handset 24, the MFP 1 and the mobile device 31 are connected to each other by wireless communications.

In this exemplary embodiment, as a wireless communication method for connecting the MFP 1 and the mobile device 31, the frequency hopping method is used, and in a broadband of 2.4 GHz band (2402 to 2480 MHz), 79 channels are set at intervals of 1 MHz, and wireless communication is made while channel switching is performed 100 times per second.

When a voice signal is transmitted from the handset 24 to the digital cordless communication controller 26, it is converted into a wireless communication digital signal and transmitted (outputted) to the mobile device 31. On the other hand, when a wireless communication digital signal transmitted from the mobile device 31 is received, it is converted into a voice signal and outputted to the handset 24.

The digital cordless communication controller 26 includes a frequency hopping controller (not shown) with a hopping pattern table, hopping counter, or clock which realizes wireless communication based on frequency hopping method with the mobile device 31.

The wireless LAN communication controller 18 is a part of the above-described wireless unit board 60, and a wireless LAN antenna 19 (main antenna 60e and sub antenna 60f) is connected thereto. The wireless LAN communication controller 18 is wirelessly connected to the access point 51 as wireless LAN equipment via this wireless LAN antenna 19. As a result, the MFP 1 can make data communication with a PC 61 as wireless LAN equipment connected to the access point 51.

The wireless LAN communication controller 18 is wirelessly connected to the access point 51 via the wireless LAN antenna 19 and is connected to a LAN 200 via this access point 51. As a result, the MFP 1 can make data communication with an external device (not shown) connected to the LAN 200.

The access point 51 is a wireless LAN equipment as a communication apparatus, and is a repeater which is wirelessly connected to a plurality of wireless LAN equipment such as the MFP 1 and the PC 61 as a wireless LAN terminal and connects these wireless LAN equipment to the LAN 200.

On the other hand, the mobile device 31 mainly includes, as shown in FIG. 3, a CPU 32, a ROM 33, a RAM 34, a flash memory 35, an operating unit 36, a display unit 37, a transmitting and receiving circuit 38, and a digital cordless communication controller 39, and these are connected to each other via a bus line 40.

The CPU 32 is an operational unit which controls the respective units connected via the bus line 40 according to fixed values stored in the ROM 33, the RAM 34, and the flash memory 35 or according to various signals transmitted and received via the digital cordless communication controller 39.

The ROM 33 is a non-rewritable memory provided with a control program area 33a as an area for storing various control programs to be executed in this mobile device 31. In the control program area 33a, for example, programs for executing processings shown in the flowcharts of FIG. 5 and FIG. 7 described later are stored.

The RAM 34 is a rewritable memory for temporarily storing various data. In this RAM 34, a multi transmission flag 34a and a multi reception flag 34b are provided.

The multi transmission flag 34a indicates whether the number of data transmissions to the MFP 1 is set to 1 or 2, and is turned off when the number of data transmissions to the MFP 1 is set to 1, and is turned on when the number of transmissions is set to 2. The multi transmission flag 34a is initialized to be off according to turning-on of the power supply to the MFP 1, set to be on in response to a multi slot communication request from the MFP 1, and set to be off in response to a single slot communication request.

The multi reception flag 34b indicates whether the number of data transmissions from the MFP 1, that is, the number of data receptions from the MFP 1 is set to 1 or 2, and is turned off when the number of receptions is set to 1, and is turned on when the number of receptions is set to 2. The multi reception flag 34b is initialized to be off according to turning-on of the power supply to the mobile device 31, set to be on in response to a multi slot communication request from the MFP 1, and set to be off in response to a single slot communication request.

The flash memory 35 is a rewritable nonvolatile memory, and data stored in the flash memory 35 is stored even after the power supply of the mobile device 31 is turned off. The operating unit 36 is used for managing the mobile device 31 and calling with the MFP 1 and an external device (not shown) connected via the MFP and the telephone line network 100, and consists of, for example, numeric buttons (numeric keys), a call button, and a function operating button, etc. The display unit 37 displays a telephone number inputted from the operating unit 36 when calling with the MFP 1 or an external device, and various information while calling, and consists of a display device such as a LCD.

The transmitting and receiving circuit 38 is a device for calling with the MFP 1 or an external device (not shown) connected via the telephone line network 100, and a microphone (not shown) and a speaker (not shown) are connected thereto. The microphone (not shown) converts voice into a voice signal and inputs it into the transmitting and receiving circuit 38, and the speaker (not shown) converts a voice signal inputted from the transmitting and receiving circuit 38 into voice and outputs (sounds) it to the outside, and outputs (sounds) various sounds corresponding to the status (for example, operation sounds of the operating unit 36, warning sounds when an error occurs, and ring tones, etc.).

This transmitting and receiving circuit 38 is connected to the digital cordless communication controller 39 when a call start operation is performed on the operating unit 36. When a call ending operation is performed on the operating unit 36, the connection to the digital cordless communication controller 39 is disconnected.

To the digital cordless communication controller 39, a cordless antenna 47 is connected. As a result of connection between the transmitting and receiving circuit 38 and the digital cordless communication controller 39 by a call start operation or the like on the operating unit 36, the mobile device 31 and the MFP 1 are connected by wireless communication. As described above, in this exemplary embodiment, the wireless communication which connects the MFP 1 and the mobile device 31 uses frequency hopping method.

When a voice signal is transmitted from the transmitting and receiving circuit 38 to the digital cordless communication controller 39, it is converted into a wireless communication digital signal and transmitted (outputted) to the MFP 1. On the other hand, when a wireless communication digital signal transmitted from the MFP 1 is received, it is converted into a voice signal and outputted to the transmitting and receiving circuit 38.

The digital cordless communication controller 39 has a frequency hopping controller (not shown) with a hopping pattern table, hopping counter or clock which realizes wireless communication based on frequency hopping method with the MFP 1.

Figure 4:
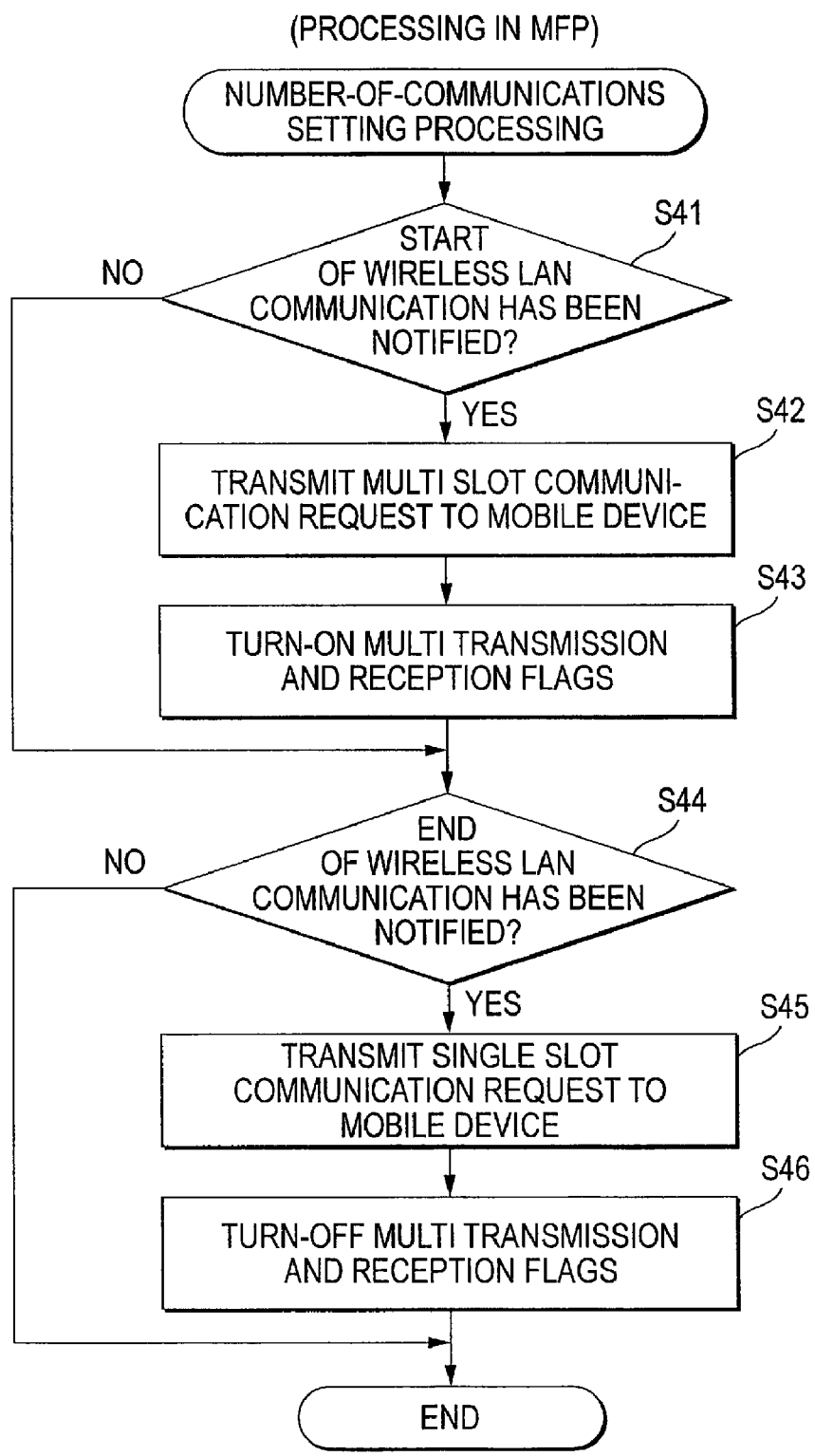
FIG. 4 is a flowchart showing number-of-communications setting processing to be executed in the MFP.

FIG. 4 is a flowchart showing number-of-communications setting processing to be executed in the MFP 1. The number-of-communications setting processing shown in FIG. 4 is processing for setting the number of transmissions and receptions of the same data in the case of wireless communication between the MFP 1 and the mobile device 31, and is processing repeatedly executed at predetermined time intervals (for example, 10 sec).

In this processing, first, it is determined whether the start of wireless LAN communication has been notified (S41). The notification of the start of wireless LAN communication described herein means a signal for requesting communication start to another device from the MFP 1 or requesting communication start to the MFP from the other device at first when the wireless communication is going to be made between the MFP 1 and the other device.

Then, when the start of wireless LAN communication is notified (S41: Yes), the multi slot communication request is transmitted to the mobile device 31 (S42) and the multi transmission and reception flags (the multi transmission flag 13a and the multi reception flag 13b) are turned on (S43). Then, this processing ends. The mobile device 31 which receives the multi slot communication request transmitted in S42 executes number-of-communications setting processing shown in the flowchart of FIG. 5.

Next, it is determined whether the end of wireless LAN communication has been notified (S44). The notification of the end of wireless LAN communication described herein means a signal for requesting communication end to the other device from the MFP 1 or requesting communication end to the MFP 1 from the other device at end when a series of wireless communications are made between the MFP 1 and the other device.

Then, when the end of wireless LAN communication is notified (S44: Yes), a single slot communication request is transmitted to the mobile device 31 (S45), and the multi transmission and reception flags (the multi transmission flag and the multi reception flag) are turned off (S46). Then, this processing ends. The mobile device 31 which receives the single slot communication request transmitted in S45 executes number-of-communications setting processing shown in the flowchart of FIG. 5.

Thus, by this number-of-communications setting processing, in a wireless communication time period from a start to an end of wireless communication with the other device (for example, PC 61 or other communication equipment via the LAN 200) by the wireless LAN communication controller 18 (during transmission of data from the MFP 1 to the other device, or during reception of data transmitted from the other device by the MFP 1), the multi transmission and reception flags (the multi transmission flag 13a and the multi reception flag 13b) of the MFP 1 can be turned on. That is, the number of communications for transmitting and receiving the same data in the wireless communication with the mobile device 31 can be set to 2, and out of the wireless communication period, the multi transmission and reception flags (the multi transmission flag 13a and the multi reception flag 13b) of the MFP 1 can be turned off, that is, the number of communications for transmitting and receiving the same data in the wireless communication with the mobile device 31 can be set to 1.

Figure 5:
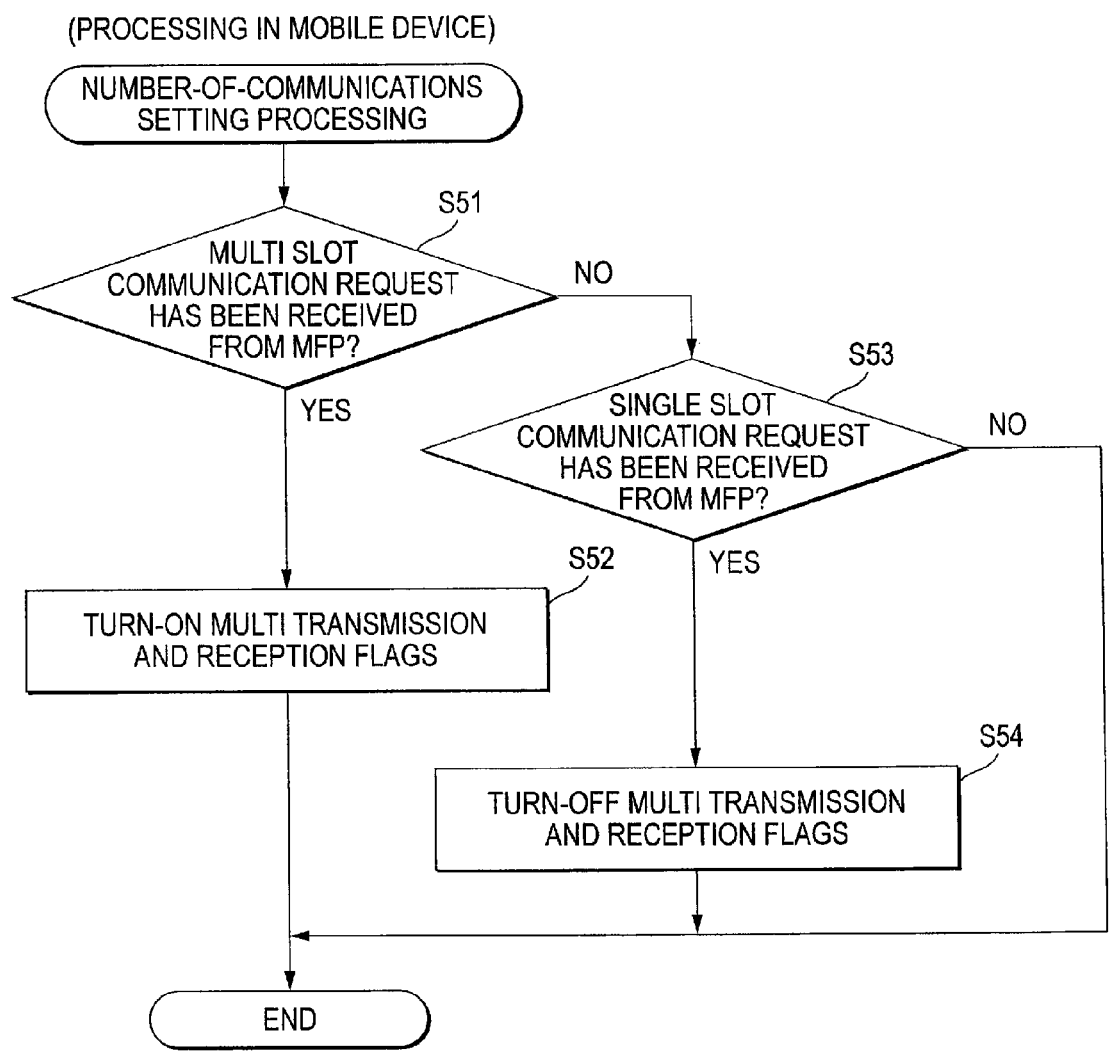
FIG. 5 is a flowchart showing number-of-communications setting processing to be executed in the mobile device.

FIG. 5 is a flowchart showing number-of-communications setting processing to be executed in the mobile device 31. This processing is for setting turning on or off of the multi transmission and reception flags (the multi transmission flag 34a and the multi reception flag 34b) of the mobile device 31 in response to a multi slot communication request or a single slot communication request transmitted from the MFP 1.

In this processing, first, it is confirmed whether a multi slot communication request has been received from the MFP 1 (S51), and when a multi slot communication request is received from the MFP 1 (S51: Yes), the multi transmission and reception flags are turned on (S52). Then, this processing ends.

On the other hand, in S51, when it is determined that a multi slot transmission request has not been received from the MFP 1 (S51: No), it is confirmed whether a single slot communication request has been received from the MFP 1 (S53). When a single slot communication request is received from the MFP 1 (S53: Yes), the multi transmission and reception flags are turned off (S54). Then, this processing ends.

In the processing of S53, when it is determined that a single slot communication request has not been received from the MFP 1 (S53: No), this processing ends.

Thus, by this number-of-communications setting processing, the settings of the multi transmission and reception flags (the multi transmission flag 34a and the multi reception flag 34b) of the mobile device 31 which wirelessly communicates with the MFP 1 can be made equal to that of the MFP 1, and communication quality of wireless communication between the MFP 1 and the mobile device 31 can be maintained.

Accordingly, the number of communication is set (determined) before data communication has started.

Figure 6:
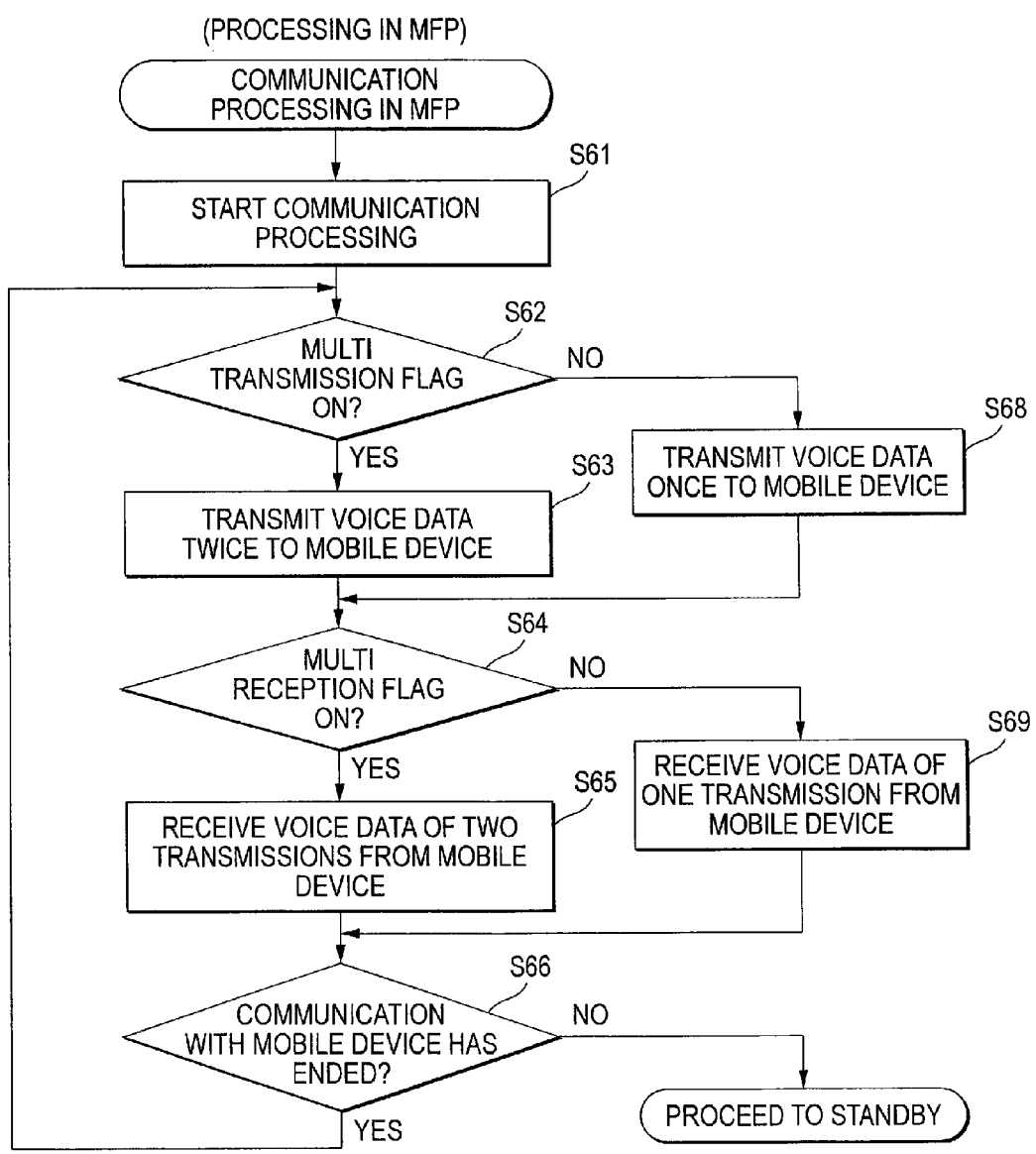
FIG. 6 is a flowchart showing a communication processing in the MFP.
Figure 7:
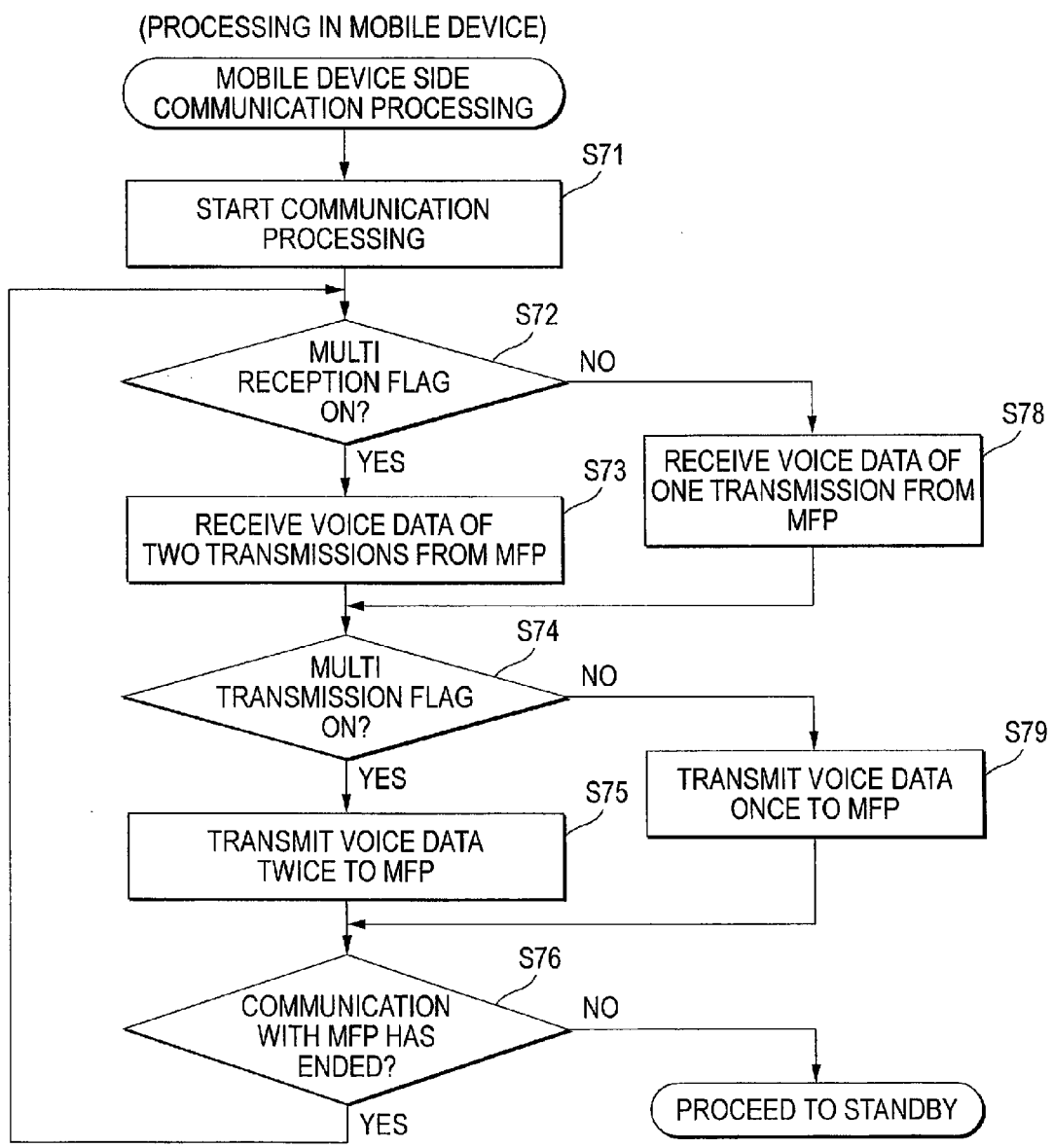
FIG. 7 is a flowchart showing a communication processing in the mobile device.

FIG. 6 is a flowchart showing a communication processing in MFP 1 in the wireless communication between the MFP 1 and the mobile device 31. The wireless communication of the MFP 1 and the mobile device 31 of this exemplary embodiment is based on frequency hopping method, and the communication processing is MFP 1 shown in the flowchart of FIG. 6 and the communication processing in mobile device shown in the flowchart of FIG. 7 are synchronized with each other.

The communication processing in MFP 1 shown in the flowchart of FIG. 6 is mainly executed by the digital cordless communication controller 36, and starts when a communication start request is issued to the MFP 1 from the mobile device 31 in response to a connection request from the MFP 1 to the mobile device 31, or when a communication start request is issued to the mobile device 31 from the MFP 1 in response to a connection request from the mobile device 31 to the MFP 1.

The connection request from the MFP 1 (or the mobile device 31) to the mobile device (or the MFP 1) means that the MFP 1 (or mobile device 31) is in an off-hook state and the call start button for starting calling with the mobile device 31 (or the MFP 1) is depressed on the operating unit 15 (or the operating unit 36) by a user. The communication start request from the mobile device 31 (or the MFP 1) to the MFP 1 (or the mobile device 31) means that the mobile device 31 (or the MFP 1) is in an off-hook state and the call start button for starting calling with the MFP 1 (or the mobile device 31) is depressed on the operating unit 36 (or the operating unit 15) by a user in response to the connection request from the MFP 1 (or mobile device 31).

In this communication processing in MFP 1, first, communication processing starts (S61). When the communication processing starts at the processing of S61, initial setting for wireless communication based on frequency hopping method is performed, and it is started to convert an analog voice signal inputted from the handset 24 into digital voice data and successively record it on a transmission buffer (not shown) provided inside the RAM 13. And, it is started to successively record digital voice data received from the mobile device 31 on a reception buffer (not shown) provided inside the RAM 13.

After the processing of S61, it is confirmed whether the multi transmission flag 13a is on (S62), and when it is on (S62: Yes), the voice data is transmitted twice from the transmission buffer (not shown) to the mobile device 31 (S63). On the other hand, as a result of confirmation by the processing of S62, when the multi transmission flag 13a is off (S62: No), the voice data is transmitted once from the transmission buffer (not shown) to the mobile device 31 (S68).

After the processing of S63 or S68, it is confirmed whether the multi reception flag 13b is on (S64). When it is on (S64: Yes), voice data less likely to have no error among voice data of two transmissions from the mobile device 31 stored in the reception buffer (not shown). And the stored voice data is converted into an analog voice signal and then outputted from the handset 24 (S65).

On the other hand, as a result of confirmation by the processing of S64, when the multi reception flag 13b is off (S64: No), voice data of a corresponding channel of one transmission from the mobile device 31 stored in the reception buffer (not shown) is received, and converted into an analog voice signal and then outputted from the handset 24 (S69).

After processing of S65 or S69, it is confirmed whether the communication with the mobile device 31 has been ended (S66), and when the communication with the mobile device 31 is not ended (S66: No), the communication channel is updated (S67), and the process proceeds to the processing of S62. On the other hand, as a result of confirmation by the processing of S66, when the communication with the mobile device 31 is ended (S66: Yes), the process proceeds to a standby state.

FIG. 7 is a flowchart showing a communication processing in the mobile device 31 in wireless communication between the MFP 1 and the mobile device 31. The communication processing in the mobile device 31 shown in the flowchart of FIG. 7 is mainly executed by the digital cordless communication controller 39. Similarly to the above-described communication processing in the MFP 1, the communication processing in the mobile device 1 starts when a communication start request is issued to the MFP 1 from the mobile device 31 in response to a connection request from the MFP 1 to the mobile device 31 or when a communication start request is issued to the mobile device 31 from the MFP 1 in response to a connection request from the mobile device 31 to the MFP 1.

In this communication processing in the mobile device 31, first, communication processing starts (S71). When the communication processing starts at the processing of S71, initial setting for wireless communication based on frequency hopping method is performed, and it is started to convert an analog voice signal inputted from a microphone connected to the transmitting and receiving circuit 38 into digital voice data and successively record it on a transmission buffer (not shown) provided inside the RAM 34. And it is started to successively record digital voice data received from the MFP 1 on a reception buffer (not shown) provided inside the RAM 34.

After the processing of S71, it is confirmed whether the multi reception flag 34b is on (S72), and when it is on (S72: Yes), voice data less likely to have an error among voice data of two transmissions from the MFP 1 is stored in the reception buffer (not shown). The voice data is converted into an analog voice signal and outputted from the speaker connected to the transmitting and receiving circuit 38 (S73).

On the other hand, as a result of confirmation by the processing of S72, when the multi reception flag 34b is off (S72: No), voice data of one transmission from the MFP 1 stored in the reception buffer (not shown) is received. And the received voice data is converted into an analog voice signal and then outputted from the speaker connected to the transmitting and receiving circuit 38 (S78).

After the processing of S73 or S78, it is confirmed whether the multi transmission flag 34a is on (S74), and when it is on (S74: Yes), voice data is transmitted twice to the MFP 1 from the transmission buffer (not shown) (S75).

On the other hand, as a result of confirmation by the processing of S74, when the multi transmission flag 34a is off (S74: No), voice data is transmitted once to the MFP 1 from the transmission buffer (not shown) (S79).

After the processing of S75 or S79, it is confirmed whether the communication with the MFP 1 has been ended (S76). When the communication with the MFP 1 is not ended (S76: No), the communication channel is updated (S77), and the process proceeds to the processing of S72. On the other hand, as a result of confirmation by the processing of S76, when the communication with the MFP 1 is ended (S76: Yes), the process proceeds to a standby state.

As described in FIG. 6 and FIG. 7, in the wireless communication between the MFP 1 and the mobile device 31, when the wireless LAN communication controller 18 is under communication (the multi transmission flags 13a and 34a and the multi reception flags 13b and 34b are on), the same data is transmitted and received twice repeatedly, and when the wireless LAN communication controller 18 is not under communication (the multi transmission flags 13a and 34b and the multi reception flags 13b and 34b are off), the same data is transmitted and received only once. Therefore, communication quality can be maintained by simple processing, and power saving can be realized.

In other words, when wireless communication is made by the digital cordless communication controller 26 in a wireless communication time period in which wireless communication with the other device is made by the wireless LAN communication controller 18, there is a possibility that radio wave interference occurs. However, according to the above configuration, in this case, in the communication made by the digital cordless communication controller 26, data is repeatedly transmitted a plurality of times to the mobile device 31. Therefore, even if radio wave interference occurs with the wireless LAN communication controller 18, communication quality can be maintained.

In a period out of the wireless communication time period in which wireless communication is made by the wireless LAN communication controller 18, even when wireless communication is made by the digital cordless communication controller 26, radio wave interference with the wireless LAN communication controller 18 does not occur. In this case, according to the above configuration, in the communication made by the digital cordless communication controller 26, data is transmitted only once to the other device. Therefore, power can be saved than in the case of the plurality of transmissions.

Further, the settings of the multi transmission flags 13a and 34a and the multi reception flags 13b and 34b are based on whether the wireless LAN communication controller 18 makes wireless communication with the other device. The wireless LAN communication controller 18 is installed in the communication apparatus itself, so that the multi transmission flags 13a and 34a and the multi reception flags 13b and 34b can be set by simple processing.

Next, with reference to the flowchart of FIG. 8, a second exemplary embodiment of the present invention will be described. In this second exemplary embodiment, the setting conditions of the multi transmission flags 13a and 34a and the multi reception flags 13b and 34b are different from those of the first exemplary embodiment. Descriptions of the parts whose configuration are common between the second exemplary embodiment and the first exemplary embodiment will be omitted.

Figure 8:
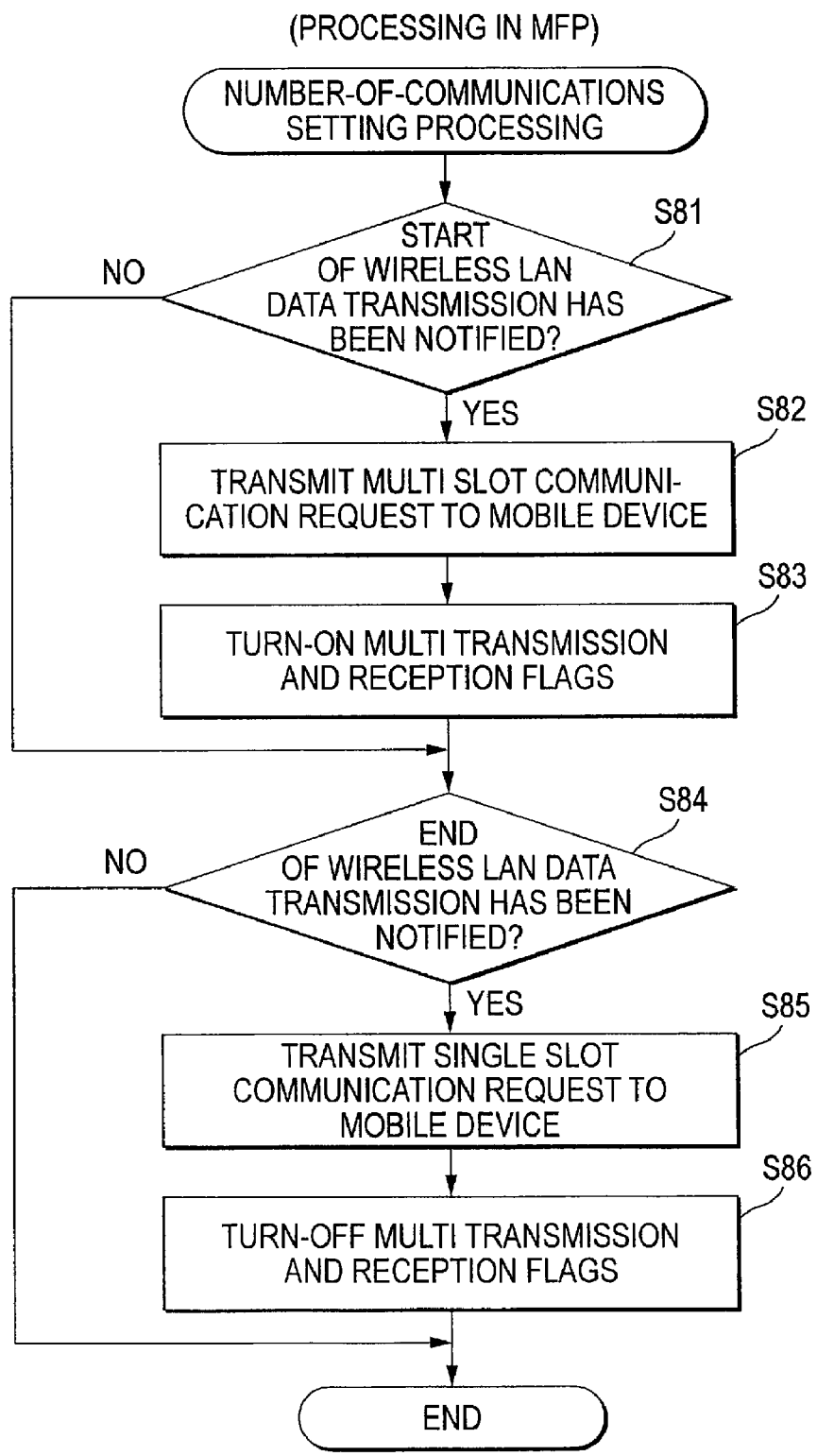
FIG. 8 is a flowchart showing number-of-communications setting processing to be executed in an MFP according to a second exemplary embodiment.

FIG. 8 is a flowchart showing number-of-communications setting processing to be executed in the MFP 1, corresponding to FIG. 4. The number-of-communications setting processing shown in FIG. 8 is for setting the number of communications for transmitting and receiving the same data in the case of wireless communication between the MFP 1 and the mobile device 31, and is repeatedly executed at predetermined time intervals (for example, 10 sec).

In this processing, first, it is determined whether the start of wireless LAN data transmission has been notified (S81). The notification of the start of wireless LAN data transmission described herein means a signal for requesting receiving of data to be transmitted from the MFP 1 to another device in the case where wireless communication is going to be made via the wireless LAN communication controller 18 between the MFP 1 and the other device. And, the notification does not mean a signal for requesting receiving of data to be transmitted from the other device to the MFP 1.

Then, when the start of wireless LAN data transmission is notified (S81: Yes), further, a multi slot communication request is transmitted to the mobile device 31 (S82), and the multi transmission and reception flags (the multi transmission flag 13*a* and the multi reception flag 13*b*) are turned on (S83) and this processing ends. The mobile device 31 which receives the multi slot communication request transmitted in S82 executes the number-of-communications setting processing shown in the flowchart of FIG. 5.

Next, it is determined whether the end of wireless LAN data transmission has been notified (S84). The notification of the end of wireless LAN data transmission described herein means a signal indicating the end of data transmission transmitted from the MFP 1 to the other device when a series of wireless communications are made between the MFP 1 and the other device end.

Then, when the end of wireless LAN data transmission is notified (S84: Yes), a single slot communication request is transmitted to the mobile device 31 (S85), and the multi transmission and reception flags (the multi transmission flag and the multi reception flag) are turned off (S86), and this processing ends. The mobile device 31 which receives the single slot communication request transmitted in S85 executes the number-of-communications setting processing shown in the flowchart of FIG. 5.

By this number-of-communications setting processing, in a data transmission period from a start to an end of data transmission to the other device (for example, PC 61 or other communication equipment via the LAN 200) by the wireless LAN communication controller 18 (that is a period in which data is transmitted from the MFP 1 to the other device, and is not a period in which the MFP 1 receives data transmitted from the other device), the multi transmission and reception flags (the multi transmission flag 13*a* and the multi reception flag 13*b*) of the MFP 1 can be turned on. That is, the number of communications for transmitting and receiving the same data in the wireless communication with the mobile device 31 can be set to 2. And, out of the wireless communication period, the multi transmission and reception flags (the multi transmission flag 13*a* and the multi reception flag 13*b*) of the MFP 1 can be turned off. That is, the number of communications for transmitting and receiving the same data in the wireless communication with the mobile device 31 can be set to 1.

Then, when the multi transmission flag 13*a* and the multi reception flag 13*b* of the MFP 1 are set, the communication processing in MFP 1 similar to that described in FIG. 6 is executed according to these settings of the multi transmission flag 13*a* and the multi reception flag 13*b*. In the mobile device 31, similar to the description in FIG. 5, the multi transmission flag 34*a* and the multi reception flag 34*b* are also set, and the communication processing in the mobile device similar to that in FIG. 7 is executed according to these settings of the multi transmission flag 34*a* and the multi reception flag 34*b*.

In the wireless communication made between the MFP 1 and the mobile device 31 in this second exemplary embodiment, when the wireless LAN communication controller 18 is transmitting data to the other device (the multi transmission flags 13*a* and 34*a* and the multi reception flags 13*b* and 34*b* are on), the same data is repeatedly transmitted and received twice, and when the wireless LAN communication controller 18 is not transmitting data to the other device (the multi transmission flags 13*a* and 34*a* and the multi reception flags 13*b* and 34*b* are off), the same data is transmitted and received once. Therefore, power can be further saved than in the first exemplary embodiment. In other words, the power can be further saved than in the case where data is repeatedly transmitted a plurality of times to the other device in the whole wireless communication period in which the wireless LAN communication controller 18 performs wireless communication including data transmission and reception.

Next, with reference to the flowchart of FIG. 9, a third exemplary embodiment of the present invention will be described. In this third exemplary embodiment, the setting conditions of the multi transmission flags 13*a* and 34*a* and the multi reception flags 13*b* and 34*b* are different from those of the first exemplary embodiment. Descriptions of the parts whose configuration are common between the third exemplary embodiment and the first exemplary embodiment will be omitted.

Figure 9:
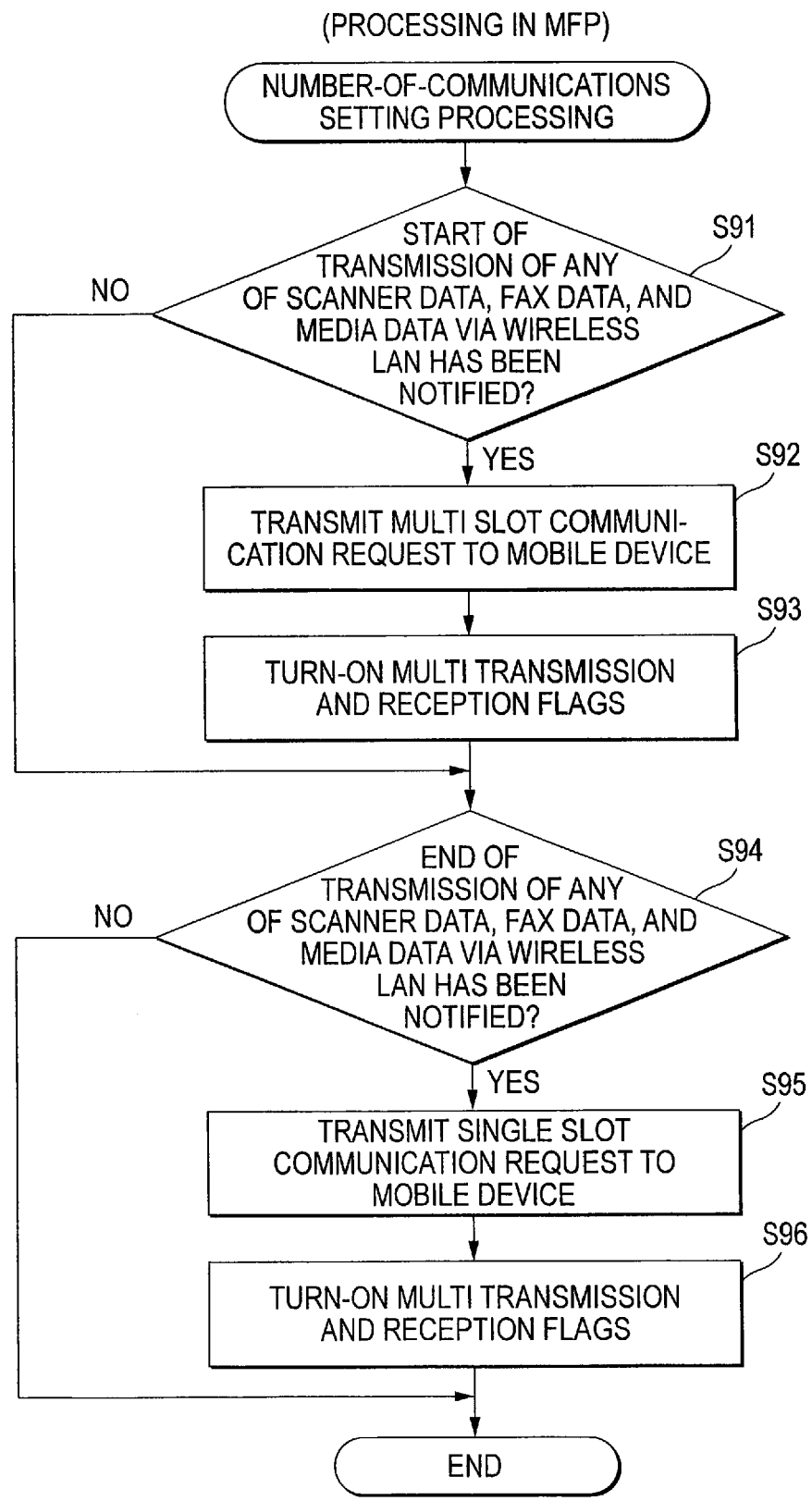
FIG. 9 is a flowchart showing number-of-communications setting processing to be executed in an MFP according to a third exemplary embodiment.

FIG. 9 is a flowchart showing number-of-communications setting processing to be executed in the MFP 1, corresponding to FIG. 4. The number-of-communications setting processing shown in FIG. 9 is for setting the number of communications for transmitting and receiving the same data in the case of wireless communication between the MFP 1 and the mobile device 31, and is repeatedly executed at predetermined time intervals (for example, 10 sec).

In this processing, first, it is determined whether the start of transmission for transmitting any of scanner data, FAX data, and media data via the wireless LAN communication controller 18 has been notified (S91). The notification of the start of transmission described herein means a signal for requesting receiving any of the scanner data, FAX data, and media data transmitted from the MFP 1 to another device in the case where wireless communication is going to be made via the wireless LAN communication controller 18 between the MFP 1 and the other device. And the notification does not mean a signal for requesting receiving of data transmitted from the other device to the MFP 1.

Then, when transmission of any data is notified (S91: Yes), a multi slot communication request is transmitted to the mobile device 31 (S92) and the multi transmission and reception flags (the multi transmission flag 13*a* and the multi reception flag 13*b*) are turned on (S93). Then, this processing ends. The mobile device 31 which receives the multi slot communication request transmitted in S92 executes the number-of-communications setting processing shown in the flowchart of FIG. 5.

Next, it is determined whether the end of transmission of any of scanner data, FAX data, and media data via the wireless LAN communication controller 18 has been notified (S94). The notification of the end of transmission means a signal indicating the end of data transmission transmitted from the MFP 1 to the other device in the case where a series of wireless communications are made between the MFP 1 and the other device.

Then, when the end of transmission of any data is notified (S94: Yes), a single slot communication request is transmitted to the mobile device 31 (S95), and the multi transmission and reception flags (the multi transmission flag and the multi reception flag) are turned off (S96). Then, this processing ends. The mobile device 31 which receives the single slot communication request transmitted in S95 executes the number-of-communications setting processing shown in the flowchart of FIG. 5.

By this number-of-communications setting processing, in a period from a start to an end of transmission of any of scanner data, FAX data, and media data to the other device (for example, PC 61 or other communication equipment via the LAN 200) by the wireless LAN communication controller 18 (that is a period in which data is transmitted from the MFP 1 to the other device, and is not a period in which the MFP 1 receives data transmitted from the other device), the multi transmission and reception flags (the multi transmission flag 13a and the multi reception flag 13b) of the MFP 1 can be turned on. That is, the number of communications for transmitting and receiving the same data in the wireless communication with the mobile device 31 can be set to 2. And out of the wireless communication period, the multi transmission and reception flags (the multi transmission flag 13a and the multi reception flag 13b) of the MFP 1 can be turned off. That is, the number of communications for transmitting and receiving the same data in the wireless communication with the mobile device 31 can be set to 1.

Then, when the multi transmission flag 13a and the multi reception flag 13b of the MFP 1 are set, communication processing in MFP 1 similar to that described in FIG. 6 is executed according to the settings of the multi transmission flag 13a and the multi reception flag 13b. In the mobile device 31, in the same manner as described in FIG. 5, the multi transmission flag 34a and the multi reception flag 34b are set, and the communication processing in mobile device similar to that of FIG. 7 is executed according to the settings of the multi transmission flag 34a and the multi reception flag 34b.

In the wireless communication between the MFP 1 and the mobile device 31 in this third exemplary embodiment, when the wireless LAN communication controller 18 is transmitting any of scanner data, FAX data, and media data to the other device (the multi transmission flags 13a and 34a and the multi reception flags 13b and 34b are on), the same data is transmitted and received twice repeatedly. On the other hand, when the wireless LAN communication controller 18 is not transmitting any of scanner data, FAX data, and media data to the other device (the multi transmission flags 13a and 34a and the multi reception flags 13b and 34b are off), the same data is transmitted and received once. Therefore, power can be further saved than in the case of a plurality of repeated transmissions of data to the other device in the whole wireless communication period in which the wireless LAN communication controller 18 makes wireless communication.

Figure 10:
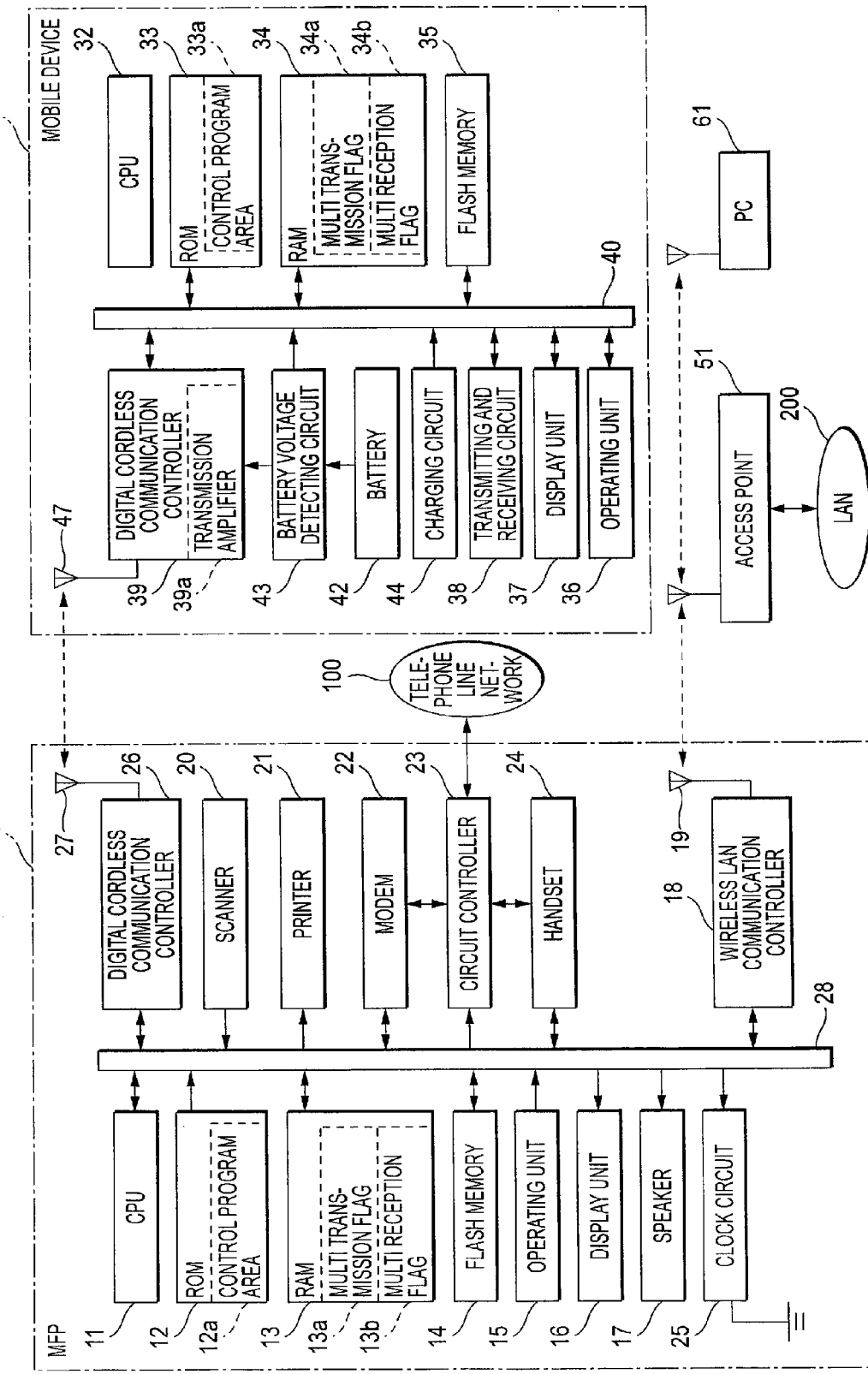
FIG. 10 is a block diagram showing electrical configuration of an MFP and a mobile device according to a fourth exemplary embodiment.

Next, a fourth exemplary embodiment of the present invention will be described with reference to FIG. 10 through FIG. 12. FIG. 10 is a block diagram showing electrical configuration of the MFP 1 and the mobile device 31, corresponding to FIG. 3. The same components as described in FIG. 3 are attached with the same reference numerals, and description thereof will be omitted.

The mobile device 31 of this fourth exemplary embodiment includes a transmission amplifier 39a as a part of the digital cordless communication controller 39. In addition, the mobile device includes a battery 42 as a power supply for driving this transmission amplifier 39a, a battery voltage detecting circuit 43 for detecting a voltage of this battery 42, and a charging circuit 44 which can detect whether the mobile device 31 is being charged via a charger (not shown).

The transmission amplifier 39a amplifies voice data to be transmitted from the mobile device 31 to the MFP 1, and is driven by using the battery 42 as a drive source. For other electric circuits installed in the mobile device 31, a common power supply (not shown) separate from this battery 42 is used as a drive source. For the transmission amplifier 39a, a great transmission power can be secured by installing the exclusive battery 42, and accordingly, communication quality can be maintained.

The battery voltage detecting circuit 43 is a circuit for detecting a battery voltage of the battery 42. In this exemplary embodiment, when the battery voltage is higher than a set value of 3.7V, a Hi signal is outputted, and when the battery voltage is lower than the set value of 3.5V, a Low signal is outputted.

Then, when a Hi signal is detected, that is, when the battery voltage is higher than the set value of 3.7 V, the number of communications of the same data in wireless communication with the MFP 1 is set to 1, and when a Low signal is detected, that is, when the battery voltage is lower than the set value of 3.5V, the number of communications of the same data in the wireless communication with the MFP 1 is set to 2. As the battery 42, for example, a 3-cell type nickel-hydrogen battery can be used.

Figure 11:
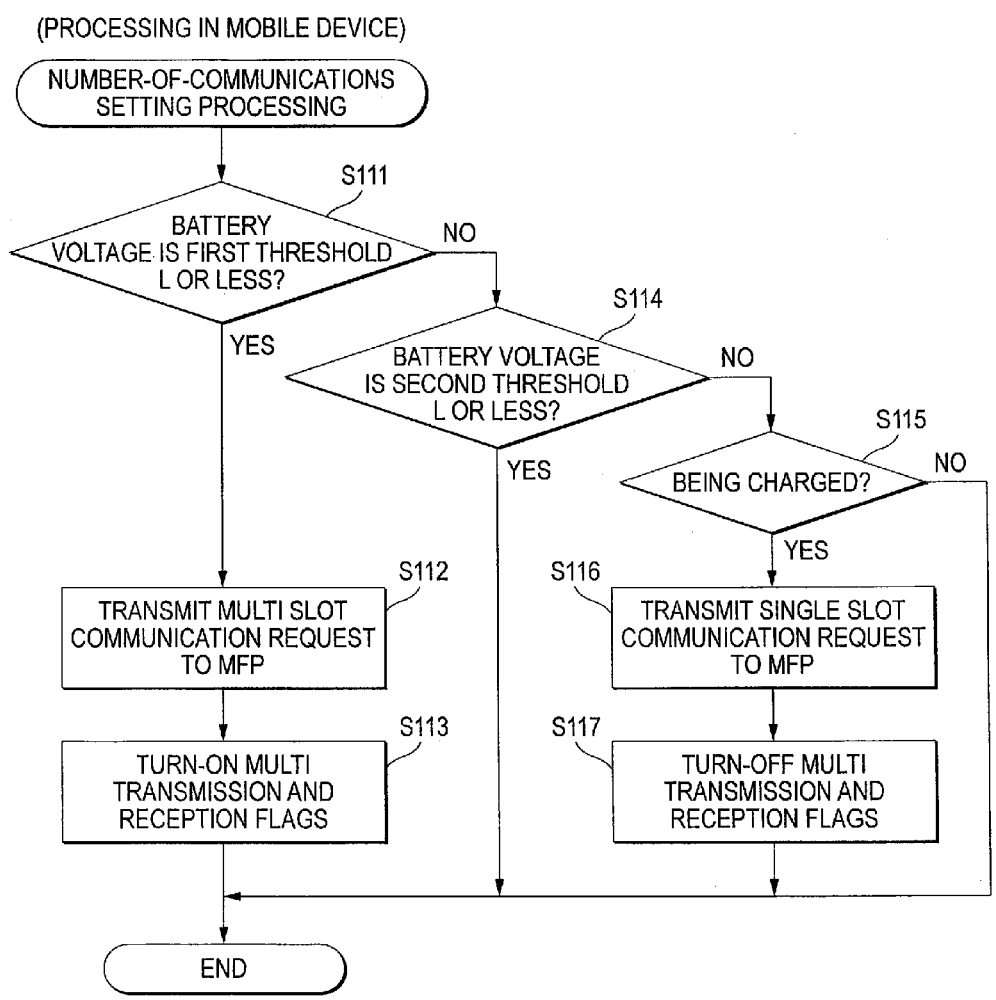
FIG. 11 is a flowchart showing number-of-communications setting processing to be executed in the mobile device according to the fourth embodiment.

FIG. 11 is a flowchart showing number-of-communications setting processing to be executed in the mobile device 31. The number-of-communications setting processing shown in FIG. 1 is for setting the number of transmissions and receptions of the same data in the case of wireless communication between the MFP 1 and the mobile device 31, and is repeatedly executed at predetermined time intervals (for example, 10 sec).

In this processing, first, it is determined whether the battery voltage of the battery 42 is the threshold L (=3.5V) or lower. In detail, it is determined whether a Low signal is outputted from the battery voltage detecting circuit 43 which detects the voltage of the battery 42 (S111). As a result, when the battery voltage of the battery 42 is the first threshold L (=3.5V) or lower (S111: Yes), a multi slot communication request is transmitted to the MFP 1 (S112), and the multi transmission and reception flags (the multi transmission flag 34a and the multi reception flag 34b) are turned on (S113). Then, this processing ends.

On the other hand, in the processing of S111, when the battery voltage of the battery 42 is higher than the first threshold L (=3.5V) (S111: No), it is determined whether the battery voltage of the battery 42 is the second threshold H (=3.7V) or lower. In detail, it is determined whether a Hi signal has been outputted from the battery voltage detecting circuit 43 (S114). As a result, when the battery voltage of the battery 42 is the second threshold H (=3.7V) (S114: Yes) or lower, this processing ends.

On the other hand, in the processing of S115, when the battery voltage of the battery 42 is higher than the second threshold H (=3.7V) (S114: No), it is determined whether the battery is being charged (S115). When it is being charged (S15: Yes), a single slot communication request is transmitted to the MFP 1 (S116) and the multi transmission and reception flags (the multi transmission flag 34a and the multi reception flag 34b) are turned off (S117). Then, this processing ends. In the processing of S115, when the battery is not being charged (S115: No), this processing ends.

Thus, by this number-of-communications setting processing, when the battery voltage of the battery 42 is the first threshold L (=3.5V) or lower, the multi transmission and reception flags (the multi transmission flag 34a and the multi reception flag 34b) can be set to be on. On the other hand when the battery voltage of the battery 42 is higher than the second threshold H (=3.7V), the multi transmission and reception flags (the multi transmission flag 34a and the multi reception flag 34b) can be set to be off.

Figure 12:
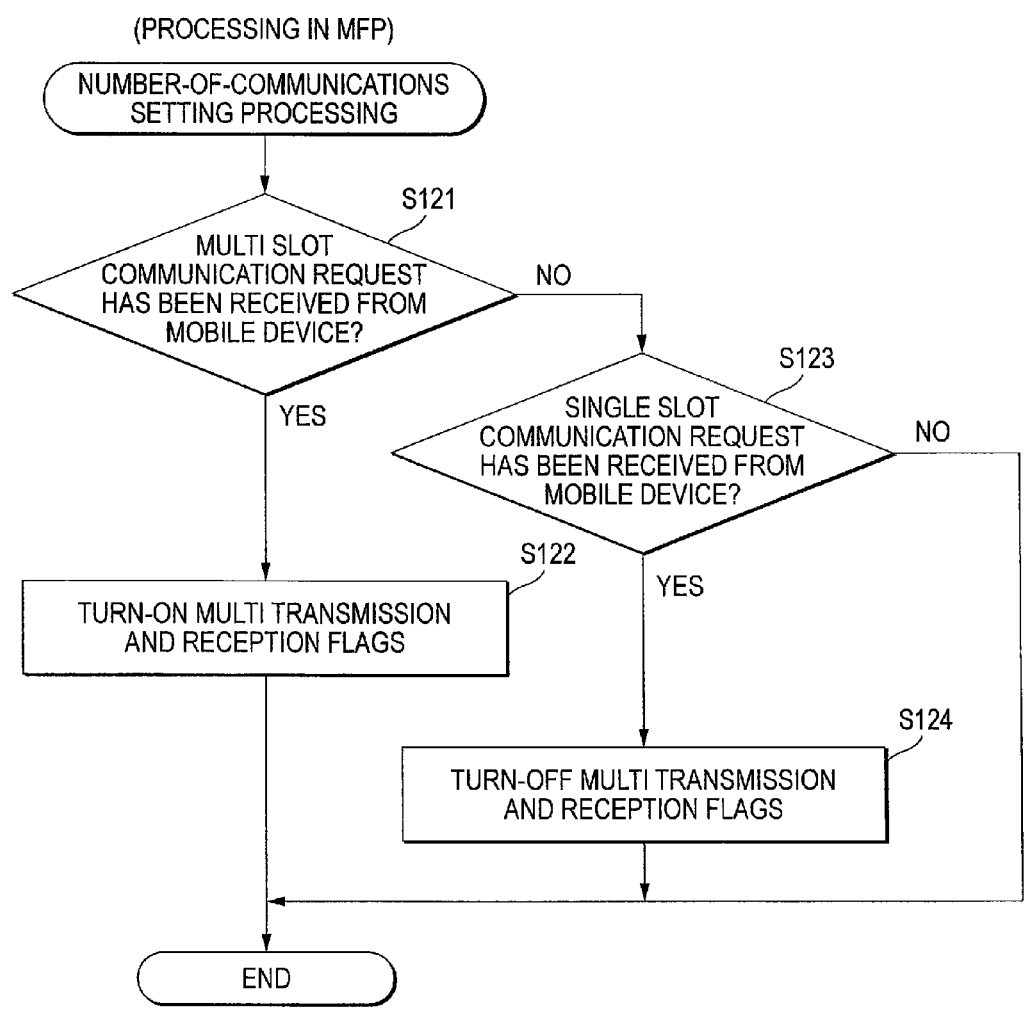
FIG. 12 is a flowchart showing number-of-communications setting processing to be executed in the MFP according to the fourth embodiment.

FIG. 12 is a flowchart showing number-of-communications setting processing to be executed in the MFP 1. This processing is for setting on/off of the multi transmission and reception flags (the multi transmission flag 13a and the multi reception flag 13b) of the MFP 1 in response to a multi slot communication request or a single slot communication request transmitted from the mobile device 31.

In this processing, first, it is confirmed whether a multi slot communication request has been received from the mobile device 31 (S121). When a multi slot communication request is received from the mobile device 31 (S121: Yes), the multi transmission and reception flags (the multi transmission flag 13a and the multi reception flag 13b) are turned on (S122) Then, this processing ends.

On the other hand, in S121, when it is determined that a multi slot transmission request has not been received from the mobile device 31 (S121: No), it is confirmed whether a single slot communication request has been received from the mobile device 31 (S123). When a single slot communication request is received from the mobile device 31 (S123: Yes), the multi transmission and reception flags (the multi transmission flag 13a and the multi reception flag 13b) are turned off (S124) Than, this processing ends. In the processing of S123, when it is determined that a single slot communication request has not been received from the mobile device 31 (S123: No). This processing ends.

By this number-of-communications setting processing, the settings of the multi transmission and reception flags (the multi transmission flag 13a and the multi reception flag 13b) of the MFP 1 which wirelessly communicates with the mobile device 31 can be made equal to those of the mobile device 31. And, the communication quality of the wireless communication between the MFP 1 and the mobile device 31 can be maintained.

When the multi transmission flag 34a and the multi reception flag 34b of the mobile device 31 are set as described in FIG. 11, and the multi transmission flag 13a and the multi reception flag 13b of the MFP 1 are set as described in FIG. 12, the communication processing in MFP and the communication processing are executed in the same manner as described in FIG. 6 and FIG. 7.

Accordingly, the number of communication is set (determined) before data communication has started.

In the wireless communication between the MFP 1 and the mobile device 31 of this fourth exemplary embodiment, when it is determined that the battery voltage of the battery 42 is the first threshold L or lower, the same data is transmitted and received twice between the mobile device 31 and the MFP 1. When it is determined that the battery voltage of the battery 42 is the second threshold H or higher, the same data is transmitted and received once between the mobile device 31 and the MFP 1.

When the battery voltage of the battery 42 is the first threshold L or lower, there is a possibility that necessary transmission power is not obtained and data is not correctly received by the MFP 1. However, according to the fourth exemplary embodiment, in this case, the data is repeatedly transmitted a plurality of times, so that communication quality can be maintained. On the other hand, when the battery voltage of the battery 42 is the second threshold H or higher, transmission power which provides sufficient communication quality is obtained, and it is not necessary to repeatedly transmit the data a plurality of times. And, in this case, the data is transmitted only once, whereby the power can be saved.

While the present invention has been shown and described with reference to certain exemplary embodiments thereof, it will be understood by those skilled in the art that various changes in form and details may be made therein without departing from the spirit and scope of the invention as defined by the appended claims.

In the exemplary embodiments described above, the number-of-communications setting processing is executed in the MFP, and a result of this processing is reflected in the mobile device 31. However, to the contrary, it is also allowed that the number-of-communications setting processing described in the flowchart of FIG. 4 is executed in the mobile device 31 and a result thereof is reflected in the MFP 1.

As communication apparatus which wirelessly communicate voice data, a main device (MFP 1) and a mobile device 31 of a digital cordless telephone are illustrated. However, the inventive concept of the present invention is also applicable to a wireless device such as a transceiver.

In the exemplary embodiments described above, change in the number of transmissions of the main device (MFP 1) and the mobile device 31 of a digital cordless telephone which wirelessly communicates voice data is illustrated. However, without limiting to the communication apparatus (MFP 1 and mobile device 31) which make wireless communication of a digital cordless telephone, and for example, the inventive concept of the present invention is also applicable to communication apparatus which make wireless communication based on other communication methods such as wireless LAN communication.

In the exemplary embodiments described above, the access point 51 is illustrated as a device which makes wireless LAN communication with the MFP 1. However, other equipment (wireless LAN equipment) capable of making wireless communication by wireless LAN such as a wireless LAN printer is also applicable.

In the exemplary embodiments described above, when the multi slot communication request has issued and the multi transmission and reception flags are turned on, the MFP 1 or mobile device 31 transmits the same data twice. However, the number of times by which the MFP 1 or mobile device 31 transmits the same data may be larger than two when the multi transmission and reception flags are turned on. Additionally, the number of times by which the MFP 1 or mobile device 31 transmits the same data may be larger than one when the multi transmission and reception flags are tuned off as long as the number is smaller than the number in case that the transmission and reception flags are turned on.

In the exemplary embodiments described above, the number of times by which the mobile device 31 transmits data is set same as the MFP 1. However, the numbers of times of transmitting the same data may be different with each other in the mobile device 31 and the MFP 1.

In the exemplary embodiments described above, the number-of-communications setting processing is repeated, for example, at 10 second intervals. However, the interval may be shorter or longer than 10 second.

The present invention provides illustrative non-limiting embodiments as follows:

A communication apparatus includes: a first communication unit which wirelessly communicates with a first device using a channel in a frequency band; a determination unit which determines a number of times by which the first communication unit transmits data to the first device before transmitting the data; and a communication controller which controls the first communication unit to transmit the data to the first device by the number of times determined by the determination unit.

The communication apparatus may further comprise a second communication unit which wirelessly communicates with a second device using a channel in the frequency band.

The determination unit comprises a communication detecting unit which detects whether the second communication unit communicates with the second device. The determination unit may determine that the number is a first number when the detecting unit detects that the second communication unit communicates with the second device, and the determination unit may determine that the number is a second number smaller than the first number when the detecting unit detects that the second communication unit does not communicate with the second device. The second number may be one.

The communication apparatus may further comprise a requesting unit which requests, via the first communication unit, the first device to transmit data to the first communication unit by a third number of times when the detecting unit detects that the second communication unit communicates with the second device, and to transmit the data to the first communication unit by a fourth number of times smaller than the third number when the detecting unit detects that the second communication unit does not communicate with the second device.

The detecting unit may detect that the second communication unit communicates with the second device during a communication time period from a time when the second communication unit receives a communication start request from the second device or transmits a communication start request to the second device, to a time when the second communication unit receives a communication end request from the second device or the second communication unit transmits a communication end request to the second device.

The detecting unit may detect that the second communication unit communicates with the second device during a transmission time period from a time when the second communication unit transmits a data transmitting start request to the second device, to a time when the second communication unit transmits a data end signal to the second device.

The communication apparatus may further comprise a data obtaining unit which obtains data. The detecting unit detects that the second communication unit communicates with the second device during a data transmission time period from a time when the second communication unit starts transmitting the data obtained by the data obtaining unit to a time when the second communication unit finishes transmitting the data.

The data obtaining unit may comprise at least one of an image reading unit which reads an image on an original to obtain the data, a data receiving unit which receives the data via a telephone line and a data reading unit which reads the data stored in an external storage.

The determination unit may comprise, a voltage detection unit which detects a voltage of a battery included in at least one of the communication apparatus and the first device, and a threshold determination unit which determines whether the detected voltage is a threshold voltage or higher. The determination unit may determines that the number is a first number when the threshold determination unit determines that the detected voltage is the threshold voltage or higher, and the determination unit may determines that the number is a second number larger than the first number when the threshold determination unit determines that the detected voltage is lower than the threshold voltage. The first number may be one.

The communication apparatus may comprise a requesting unit which requests, via the first communication unit, the first device to transmit data by a third number of times when the threshold detecting unit detects that the detected voltage is the threshold voltage or higher, and to transmit the data by a fourth number of times larger than the third number when the threshold detecting unit detects that the detected voltage is lower than the threshold voltage.

A communication system comprises the communication apparatus and the first device. The first device comprises a second communication unit which wirelessly communicates with a second device using a channel in the frequency band.

A communication system comprises the communication apparatus serving as one of a main device and an additional device; and the first device serving as the other one of the main device and the additional device. The communication apparatus may wirelessly communicate audio data with the first device.

A communication apparatus comprises: a first communication unit which wirelessly communicates with a first device using a channel in a frequency band; a second communication unit which wirelessly communicates with a second device using a channel in the frequency band; a communication detecting unit which detects whether the second communication unit communicates with the second device; and a request unit which requests the first device to transmit data by a plurality times when it is detected that the second communication unit communicates with the second device.

What is claimed is:

1. A communication apparatus comprising:
   a first communication unit which wirelessly communicates with a first device using a channel in a frequency band;
   a determination unit which determines a number of times by which the first communication unit transmits data to the first device before transmitting the data;
   a communication controller which controls the first communication unit to transmit the data to the first device by the number of times determined by the determination unit; and
   a second communication unit which wirelessly communicates with a second device using a channel in the frequency band,
   wherein the determination unit comprises a communication detecting unit which detects whether the second communication unit communicates with the second device, and
   wherein the determination unit determines that the number is a first number when the detecting unit detects that the second communication unit communicates with the second device, and the determination unit determines that the number is a second number smaller than the first number when the detecting unit detects that the second communication unit does not communicate with the second device.

2. The communication apparatus according to claim 1, wherein the second number is one.

3. The communication apparatus according to claim 1, further comprising a requesting unit which requests, via the first communication unit, the first device to transmit data to the first communication unit by a third number of times when the detecting unit detects that the second communication unit communicates with the second device, and to transmit the data to the first communication unit by a fourth number of times smaller than the third number when the detecting unit detects that the second communication unit does not communicate with the second device.

4. The communication apparatus according to claim 1, wherein the detecting unit detects that the second communication unit communicates with the second device during a communication time period from a time when the second communication unit receives a communication start request from the second device or transmits a communication start request to the second device, to a time when the second communication unit receives a communication end request from the second device or the second communication unit transmits a communication end request to the second device.

5. The communication apparatus according to claim 3, wherein the detecting unit detects that the second communication unit communicates with the second device during a communication time period from a time when the second communication unit receives a communication start request from the second device or transmits a communication start request to the second device, to a time when the second communication unit receives a communication end request from the second device or the second communication unit transmits a communication end request to the second device.

6. The communication apparatus according to claim 1, wherein the detecting unit detects that the second communication unit communicates with the second device during a transmission time period from a time when the second communication unit transmits a data transmitting start request to the second device, to a time when the second communication unit transmits a data end signal to the second device.

7. The communication apparatus according to claim 3, wherein the detecting unit detects that the second communication unit communicates with the second device during a transmission time period from a time when the second communication unit transmits a data transmitting start request to the second device, to a time when the second communication unit transmits a data end signal to the second device.

8. The communication apparatus according to claim 1, further comprising a data obtaining unit which obtains data, wherein the detecting unit detects that the second communication unit communicates with the second device during a data transmission time period from a time when the second communication unit starts transmitting the data obtained by the data obtaining unit to a time when the second communication unit finishes transmitting the data.

9. The communication apparatus according to claim 8, wherein the data obtaining unit comprises at least one of an image reading unit which reads an image on an original to obtain the data, a data receiving unit which receives the data via a telephone line and a data reading unit which reads the data stored in an external storage.

10. A communication apparatus comprising:
a first communication unit which wirelessly communicates with a first device using a channel in a frequency band;
a determination unit which determines a number of times by which the first communication unit transmits data to the first device before transmitting the data; and
a communication controller which controls the first communication unit to transmit the data to the first device by the number of times determined by the determination unit, wherein the determination unit comprises, a voltage detection unit which detects a voltage of a battery included in at least one of the communication apparatus and the first device, and a threshold determination unit which determines whether the detected voltage is a threshold voltage or higher, wherein the determination unit determines that the number is a first number when the threshold determination unit determines that the detected voltage is the threshold voltage or higher, and wherein the determination unit determines that the number is a second number larger than the first number when the threshold determination unit determines that the detected voltage is lower than the threshold voltage.

11. The communication apparatus according to claim 10, wherein the first number is one.

12. The communication apparatus according to claim 10, further comprising a requesting unit which requests, via the first communication unit, the first device to transmit data by a third number of times when the threshold determination unit determines that the detected voltage is the threshold voltage or higher, and to transmit the data by a fourth number of times larger than the third number when the threshold determination unit determines that the detected voltage is lower than the threshold voltage.

13. A communication system comprising: the communication apparatus according to claim 10; the first device; and wherein the first device comprises a second communication unit which wirelessly communicates with a second device using a channel in the frequency band.

14. A communication system comprising: the communication apparatus according to claim 1 serving as one of a main device and an additional device; and the first device serving as the other one of the main device and the additional device, wherein the communication apparatus wirelessly communicates audio data with the first device.

15. A communication apparatus comprising:
a first communication unit which wirelessly communicates with a first device using a channel in a frequency band;
a determination unit which determines a number of times by which the first communication unit transmits data to the first device before transmitting the data;
a second communication unit which wirelessly communicates with a second device using a channel in the frequency band;
a communication detecting unit which detects whether the second communication unit communicates with the second device; and
a request unit which requests the first device to transmit data by a plurality times when it is detected that the second communication unit communicates with the second device,
wherein the determination unit determines that the number is a first number when the detecting unit detects that the second communication unit communicates with the second device, and the determination unit determines that the number is a second number smaller than the first number when the detecting unit detects that the second communication unit does not communicate with the second device.

* * * * *